US008013046B2

(12) United States Patent
Phillips, Jr. et al.

(10) Patent No.: US 8,013,046 B2
(45) Date of Patent: Sep. 6, 2011

(54) METHODS OF VULCANIZING ELASTOMERS USING TALL OIL HEADS

(75) Inventors: Claude F. Phillips, Jr., Lynn Haven, FL (US); Patricia Phillips, legal representative, Lynn Haven, FL (US); Alexander J. Conte, Hollywood, SC (US)

(73) Assignee: Arizona Chemical Company, LLC, Jacksonville, FL (US)

( * ) Notice: Subject to any disclaimer, the term of this patent is extended or adjusted under 35 U.S.C. 154(b) by 453 days.

(21) Appl. No.: 11/708,645

(22) Filed: Feb. 20, 2007

(65) Prior Publication Data

US 2007/0260018 A1 Nov. 8, 2007

Related U.S. Application Data

(63) Continuation of application No. 10/573,098, filed as application No. PCT/US02/03192 on Feb. 4, 2002, now abandoned.

(60) Provisional application No. 60/267,594, filed on Feb. 8, 2001.

(51) Int. Cl.
*C08L 19/00* (2006.01)
*C08L 21/00* (2006.01)

(52) U.S. Cl. ........ 524/270; 524/271; 524/274; 524/484; 524/486; 525/343; 525/346; 525/386

(58) Field of Classification Search .................. 524/270, 524/271, 274, 484, 486; 525/343, 346, 386
See application file for complete search history.

(56) References Cited

U.S. PATENT DOCUMENTS

| 3,325,429 A | * | 6/1967 | Harris ........................... 524/300 |
| 4,420,341 A | | 12/1983 | Ferrigno |
| 4,435,477 A | | 3/1984 | Davis |
| 4,456,727 A | | 6/1984 | Middlebrook |
| 4,581,400 A | | 4/1986 | Kondo |
| 4,895,911 A | | 1/1990 | Mowdood et al. |
| 5,252,650 A | * | 10/1993 | Wideman et al. ............. 524/318 |
| 5,496,400 A | | 3/1996 | Doyle et al. |
| 6,072,009 A | * | 6/2000 | Phillips et al. ................ 525/346 |

* cited by examiner

*Primary Examiner* — Irina S Zemel

(57) ABSTRACT

Tall oil heads may be used in lieu of, or in combination with, conventional fatty acids in the compounding and curing of vulcanizable rubber. Tall oil heads inherently contain a significant amount of neutral materials, and their incorporation into a pre-vulcanized rubber composition allows the compounder to incorporate less aromatic oil into the composition. The composition may be made by a method comprising compounding a mixture comprising a vulcanizable elastomer, a sulfur source, and Tall Oil Heads (TOH), the TOH comprising 40-75 wt % fatty acids and greater than 10 wt % neutral materials, and heating the compounded mixture to a temperature sufficient to cause substantial crosslinking of the elastomer.

23 Claims, No Drawings

US 8,013,046 B2

METHODS OF VULCANIZING ELASTOMERS USING TALL OIL HEADS

This is a continuation of and claims benefit to U.S. patent application Ser. No. 10/573,098 filed Mar. 23, 2006, which is the U.S. National Stage of PCT/US02/03192 filed Feb. 4, 2002 which claimed benefit under 35 USC 119(e) to U.S. Provisional Patent Application Ser. No. 60/267,594 filed Feb. 8, 2001.

TECHNICAL FIELD

The present invention relates to rubber compounding, more particularly to cure agents for a sulfur vulcanizable elastomer, the use of such agents and the products resulting therefrom.

BACKGROUND OF THE INVENTION

Vulcanization, or curing, is a process whereby elastomers, either natural and/or synthetic, are mixed with various materials which will cause the elastomer to undergo crosslinking upon application, of heat. These materials are conventionally compounded with the elastomer to help improve the elastomer's cured physical properties, e.g., tensile strength and temperature sensitivity. Vulcanization and the resulting improved properties may be obtained by reacting the raw elastomer with sulfur in the presence of other cure activators. Oleic and stearic acids have been commonly used as activators in sulfur vulcanization of diene rubbers in the presence of zinc oxide and an accelerator.

During the early stages of a typical vulcanization process, a zinc carboxylate (the reaction product of zinc oxide and the fatty acid) reacts with the accelerator to form a complex. A nucleophilic attack by the complex on the ring of orthorhombic sulfur results in the formation of a zinc perthiomercaptide complex. This zinc perthiomercaptide complex is believed to be the sulfurating agent responsible for the crosslinking of the elastomer's chains. The role of the fatty acid is believed to increase the solubility of zinc oxide and subsequent reactivity of the zinc perthiomercaptide complex.

Stearic acid is probably the most commonly used fatty acid for vulcanization. However stearic acid suffers from the disadvantages of a high bloom rate and a rather high cost. The high bloom rate, i.e., the high rate at which the stearic acid comes to or "blooms" to the surface of the compositions, causes some loss of adhesion, properties. Another disadvantage of stearic acid is its high titer (on the order of 55° C.). This necessitates an elaborate heating system for the storage tankage and delivery systems, or addition of the stearic acid from bags.

Therefore, there exists a need for a cheaper and abundant material which can be used as a substitute for oleic or stearic acid with concomitant improvement in adhesion properties of the rubber. Recently, the use of TOFA has been described as an activator in rubber vulcanization (see, e.g., U.S. Pat. Nos. 4,895,911 and 4,870,135). Even more recently, the monomeric distillates from clay-based dimerization of an unsaturated fatty acid has been described to promote vulcanization (see U.S. Pat. Nos. 5,756,619 and 6,072,009). The present invention provides another product for rubber compounding (tall oil heads) that has not previously been recognized for this purpose.

SUMMARY OF THE INVENTION

In one aspect, the present invention provides a method for making a cross-linked elastomer which comprises compounding a mixture comprising a vulcanizable elastomer, a sulfur source, and Tall Oil Heads (TOH), the TOH comprising 40-90 wt % fatty acids and greater than 10 wt % unsaponifiable materials, and heating the compounded mixture to a temperature sufficient to cause substantial crosslinking of the elastomer. In another aspect, the present invention provides a method for making a cross-linked elastomer which comprises compounding a mixture comprising a vulcanizable elastomer, a sulfur source and from about 0.1% to about 6.0% by weight of TOH, and heating the compounded mixture to a temperature sufficient to cause substantial crosslinking of the elastomer. In another aspect, the present invention provides a method of enhancing the cure of a sulfur vulcanizable elastomer selected from the group consisting of natural rubber, synthetic rubber or mixture thereof which comprises adding TOH to a sulfur vulcanizable elastomer to provide an admixture, and heating the admixture to a temperature sufficient to achieve vulcanization. In another aspect, the present invention provides a method of enhancing the cure of a sulfur vulcanizable elastomer selected from the group consisting of natural rubber, synthetic rubber or mixture thereof which comprises adding a distillation fraction of TOH to a sulfur vulcanizable elastomer to provide an admixture, and heating the admixture to a temperature sufficient to achieve vulcanization, where in the distillation fraction comprises at least 50 wt % palmitic acid.

In another aspect, the present invention provides a compounded mixture for preparing a cross-linked elastomer, the mixture comprising a vulcanizable elastomer, a sulfur source, and TOH, the TOH comprising unsaponfiables and fatty acids where the weight of the unsaponifiable fraction exceeds 10% based on the total weight of the TOH. In yet another aspect, the present invention provides a compounded mixture for preparing a cross-linked elastomer, the mixture comprising a vulcanizable elastomer, a sulfur source, and a distillation fraction from tall oil heads (TOH), the TOH comprising unsaponifiable materials and fatty acids where the weight of the unsaponifiable fraction exceeds 10% based on the total weight of the TOH.

In another aspect, the present invention provides an article of manufacture, for example a tire, belt or hose, made by a process that comprises a method as set forth above. In yet another aspect, the present invention provides an article of manufacture selected from the group consisting of a tire, belt and hose and comprising a rubber composition prepared by a method of processing a rubber composition which includes thermomechanically mixing at a rubber temperature in a range of 140° C. to 190° C. for a mixing time of 1 to 20 minutes, where the rubber composition comprises:

(i) 100 parts by weight of at least one sulfur vulcanizable elastomer selected from conjugated diene homopolymers and copolymers and from copolymers of at least one conjugated diene and aromatic vinyl compound; and (ii) about 0.1% to about 6.0% by weight of TOH.

In another aspect, the present invention provides a vulcanized rubber composition comprising a sulfur-vulcanized rubber and the vulcanization reaction product from 0.1% to about 6.0% by weight of TOH.

In any of the foregoing aspects of the present invention, and in other aspects of the invention as described herein, in an optional embodiment the elastomer is selected from the group consisting of natural rubber, neoprene, polyisoprene, butyl rubber polybutadiene, styrene-butadiene copolymer, styrene/isoprene/butadiene rubber, methyl methacrylate-butadiene copolymer, isoprene-styrene copolymer, methyl methacrylate-isoprene copolymer, acrylonitrile-isoprene copolymer, acrylonitrile-butadiene copolymer, EPDM (rubber prepared from ethylene, propylene and diene monomers) and mixtures thereof.

In any of the foregoing aspects of the present invention, and in other aspects of the invention as described herein, including optional embodiments thereof, in further optional embodiments, the TOH (i) comprises at least one terpene, where exemplary terpenes include α-pinene, β-pinene, camphene, 3-carene, and 1-terpineol; and/or (ii) comprises at least one hydrocarbon, where exemplary hydrocarbons include β-cadinene and retene; and/or (iii) comprises at least 0.2 wt % 3,5-dimethoxystilbene; (iv) comprises a phenolic material, where exemplary phenolic materials are selected from phenol, guaiacol, ethylguaiacol, hydroeugenol, eugenol, cis-isoeugenol, trans-isoeugenol and acetoguaiacol; and/or (v) contains palmitic acid as the predominant fatty acid; and/or (vi) has an acid number in the range of 100-175; and/or (vii) 95 wt % of the TOH has a boiling point of less than about 223° C. at 8-12 mm Hg pressure, preferably about 10 mm Hg pressure; and/or (viii) provides a sufficient quantity of unsaponifiables that a corresponding reduction may be made in the quantity of process oil used in compounding an elastomer.

In the present invention, and distillation fraction of TOH may be employed, where in one aspect the distillation fraction from TOH has a palmitic acid content of at least 50 wt %, while in another aspect the distillation fraction has a palmitic acid content of at least 75 wt %; while in another aspect the distillation fraction from TOH has an acid number within the range of 150-220.

These and other aspects of the present invention will become evident upon reference to the following detailed description. In addition, various references are set forth herein. Each of these references is incorporated herein by reference in its entirety as if each were individually noted for incorporation.

DETAILED DESCRIPTION OF THE INVENTION

The present invention derives from the surprising discovery that TOH and fractionation products thereof may be effectively utilized to enhance the cure of a sulfur vulcanizable elastomer. Thus, as described in greater detail below, the present invention provides new methods of compounding elastomers, compounded elastomers, and elastomeric products produced therefrom.

Tall oil heads (TOH) is a well known material. It has been described in many U.S. Patents (see, e.g., U.S. Pat. Nos. 4,151,160; 3,887,537; and 3,804,819) as well as books (see, e.g., *Naval Stores—Production, Chemistry and Utilization*, D. F. Zinkel and J. Russel (eds.), Pulp. Chem. Assoc. Inc., 1989, Chapter 10 by Don P. Duncan; and Tall Oil and Its Uses, McGraw-Hill, Inc. (1965)). Nevertheless, the origin and composition of TOH will be briefly described.

The sulfate-based (also known as Kraft) process of wood pulping provides "black liquor", which is primarily the residue that remains when cellulose fiber is removed from the wood chips. This black liquor is basic, i.e., has a pH greater than 7, so that carboxylic acid-containing materials are in a saponified form. These saponified materials, along with some ill-defined materials, rise to the top of the black liquor tank. This floating mass is removed from the tank and is referred to as black liquor soap (BLS), and is also known as tall oil soap. The tall oil soap, upon treatment with acid to return the carboxylate materials to their carboxylic acid form, and after some washing to remove salts, etc., is known as crude tall oil (CTO).

CTO is composed of a complex mixture of individual components. However, in large part CTO is composed of fatty acids (ca. 45-55 wt %), resin acids (ca. 35-45 wt %), and neutral (i.e., non-acidic) materials (e.g., terpenic-compounds and phenolic-compounds, total ca. 5-10%). CTO refiners typically fractionate CTO by distillation to provide "cuts" (or distillation fractions) that have various compositions and properties. The volatile cut (or lowest boiling cut) is referred to as tall oil heads (TOH), and comprises ca. 5-15 wt % of the CTO. In some CTO distillation tower arrangements, the TOH can be removed from more than one of a series of columns. The remaining cuts, in order of lowest boiling point to highest boiling point, are tall oil fatty acids (TOFA, 25-35 wt %), distilled tall oil (DTO, 5-15 wt %), tall oil rosin (25-35 wt %) and pitch (15-25 wt %). Each of these fractions is commercially available and, to various degrees of success, has found commercial acceptance in a variety of uses.

Each of these cuts, or fractions, contain a unique mixture of components because of the relative volatility of the various components. Typically, each fraction contains one or more components of CTO that are either not present to a significant extent in any other fraction, or are present in only a minor amount in any other fraction. More particularly, TOH contains all of the lowest boiling materials, and has been referred to as a witch's brew containing at least several dozen components. See, e.g., Sandermann, W.; Weissman, G. *Fette Seifen Anstrichm.* 64:807, 1962; Sandermann, W.; Weissman, G. *Z. Anal. Chem.* 189:137, 1962; Sandermann, W.; Weissman, G. *Paperi ja Puu* 44:639 1962, for analysis of TOH. Roughly, TOH contains 40-75 wt % fatty acids and 25-60 wt % neutral materials, where terpenic compounds constitute the majority of the neutral materials. These neutral materials are often referred to as "unsaponifiables".

The precise composition of the TOH (CAS #65997-03-7) and the next-boiling CTO fraction, TOFA (CAS #61790-12-3), will depend on the precise distillation conditions and the specifications being followed by the operator of the distillation column. The purpose of the distillation step is to separate the light ends (palmitic acid and more volatile unsaponifiable components) from the TOFA. TOFA is generally considered a prime product with high acid number (>190), low color (generally <5 Gardner) and low titer (<10° C.). TOH is characterized as having about 7-12 Gardner color and titer slightly above that of TOFA because of the higher saturated fatty acid content. TOH has a lingering, musty odor that may be attributed to the minor components present in TOH, where this odor makes TOH unsuitable for many applications. Its titer is lower than that of commercial grades of stearic acid, thus making it easier to handle in bulk storage equipment. Its titer is greater than that of TOFA because of the higher palmitic acid content of TOH. TOH is often utilized as a fuel because of noted properties which generally make it unsuitable for many commercial applications. The purpose of the distillation process is to improve the odor of the TOFA, remove a substantial portion of the palmitic acid which elevates titer, improve color and raise acid number.

TOH (CAS No. 65997-03-7) is described as "Fatty acids, tall-oil, low boiling" whereas TOFA (CAS No. 61790-12-3) is described as "Fatty acids, tall-oil". For further clarification, the Pine Chemical Association (Atlanta, Ga.) provides the following definitions to the EPA for use in defining each. They are: "TOH: The low boiling fraction obtained by distillation of CTO or depitched CTO. Contains fatty acids such as palmitic, stearic, oleic and linoleic as well as neutral materials." "TOFA: A complex combination obtained by distillation of CTO or depitched CTO. Contains at least 90% fatty acids, primarily oleic and linoleic acids, the remainder being rosin and neutral materials." It should be noted that since TOFA contains at least 90% fatty acids, the quantity of neutrals present cannot exceed 10%. TOH according to the present invention contains greater than 10% neutrals on a weight basis, based on the total weight of the TOH. In one aspect of the invention, the TOH contains greater than 15% neutrals, while in another aspect the TOH contains greater than 20% neutrals, on a weight basis. Similarly, as referred to herein, tall oil heads will be described as containing greater than 10% unsaponifiables as a result of equating "neutrals" with "unsaponifiables" for practical purposes. The percent unsaponifiables test method is described in American Society for Testing and Materials, West Conshohocken, Pa. test method D1065-96 "Standard Test Method for Unsaponifiable Matter in Naval Stores, Including Rosin, Tall Oil, and Related Products".

The term "unsaponifiables" in the context of the present invention refers to the quantity of neutrals present plus the neutrals derived from saponification of esters, anhydrides or lactones in the testing. Generally the quantity of unsaponifiables derived from esters, anhydrides or lactones is insignificant with TOH. Thus the neutrals are equated to the total unsaponifiables in this publication.

Furthermore, for purposes of the present invention, TOH is characterized as having palmitic acid as the predominant fatty acid, greater than 10 wt % unsaponifiable (i.e., non-acidic) material, and having an acid number in the range of 100-175, optionally in the range of 125-150. In contrast, TOFA has oleic and linoleic as the predominant fatty acids, has less than 10 wt % neutral materials, and has an acid number in the range of 185-198. In summary, in comparison to TOFA, TOH has a relatively large concentration of palmitic acid, and a relatively large concentration of neutral or unsaponifiable materials. TOH typically has some residual oleic and linoleic acid as result of inefficient distillation processing. In addition, TOH contains low boiling components, particularly terpenic compounds, that are not found to a significant extent in TOFA as a result of the distillation process.

Although TOH typically contains some oleic acid and linoleic acid because of some inefficiency in the distillation process, the TOH preferably used in the present invention contains less than 20 wt % oleic acid and less than 20 wt % linoleic acid, based on the total weight of TOH. TOFA typically contains a minor amount of resin acids. The TOH of the present invention typically and preferably does not contain any resin acid. The resin acids are generally less volatile than oleic and linoleic acid. As a result of the distillation process they thus tend to be a residual component of the TOFA. Since TOH is a light ends cut the resin acids are generally present in yet lower concentrations in the TOH because they are less volatile than the oleic and linoleic acids, and if resin acid is present then it constitutes less than 1 wt % of the TOH.

In addition to fatty acid, the TOH of the present invention typically comprises trace quantities of monoterpenes according to *Naval Stores—Production, Chemistry and Utilization*, D. F. Zinkel and J. Russel. According to that reference, terpenes commonly found in TOH include α-pinene, β-pinene, camphene, 3-carene, and 1-terpineol. In addition, according to *Naval Stores—Production, Chemistry and Utilization*, D. F. Zinkel and J. Russel, TOH contains phenolic compounds. Phenolic compounds commonly found in TOH include phenol, guaiacol, ethylguaiacol, hydroeugenol, euigenol, cis-isoeugenol, trans-isoeugenol and acetoguaiacol.

The 3,5-dimethoxystilbene (DMS) from the original CTO also concentrates in the TOH because of its relative volatility. The DMS concentration in TOH is typically present at greater than 0.2% by weight. In one aspect of the present invention, the DMS concentration is 0.2-5.0%, while in another aspect the DMS concentration is 0.9-4.4%.

As stated above, TOH is the lowest boiling fraction of CTO, and comprises predominately those components having boiling point lower than that of the C-18 fatty acids (oleic and linoleic acid). Oleic and linoleic acid boil in the range of 223-224° C. at about 10 mm pressure. It has been found, according to the present invention, that in addition to TOH, distillation fractions of TOH may be used as curing agents for rubber. As palmitic acid is the predominant, high molecular weight fatty acid present in TOH, in one aspect of the present invention the distillation product of TOH is enriched in palmitic acid. Thus, in one aspect of the invention, the distillation fraction from TOH has a palmitic acid content of at least 50 wt %, and in another aspect the palmitic acid content is at least 75 wt % of the distillation fraction. In another aspect of the present invention, the distillation fraction from TOH has an acid number within the range of 150-220.

TOH is commercially available from a number of refiners such as Arizona Chemical Company (Panama City, Fla.); Georgia Pacific, Hercules, and Westvaco (North Charleston, S.C.).

In one aspect, the present invention is directed to processing sulfur-vulcanizable rubbers or elastomers containing olefinic unsaturation. The terms "rubber" and "elastomer" are used according to their standard meanings in the art. Thus, the phrase "rubber or elastomer containing olefinic unsaturation" is intended to include both natural rubber and its various raw and reclaim forms as well as various synthetic rubbers. As used herein the terms "rubber" and "elastomer" are used interchangeably, unless otherwise indicated. The terms "rubber composition", "compounded rubber" and "rubber compound" are also used interchangeably to refer to rubber which has been blended or mixed with various materials and ingredients.

Representative synthetic rubbers are the homopolymerization products of butadiene and its homologues and derivatives, for example, methylbutadiene, dimethylbutadiene and pentadiene as well as copolymers thereof, including copolymers formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerizes with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether.

Specific examples of synthetic rubbers include neoprene (polychloroprene), polybutadiene (including cis-1,4-polybutadiene), polyisoprene (including cis-1,4-polyisoprene), butyl rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Two preferred rubbers are SBR and polybutadiene.

In one aspect the rubber is a mixture of at least two diene based rubbers. For example, a combination of two or more rubbers such as cis-1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis-1,4-polybutadiene rubbers and emulsion polymerization prepared butadiene/acrylonitrile copolymers.

The rubber (elastomer) may be an emulsion polymerization-derived styrene/butadiene (E-SBR) having a conventional styrene content of about 20 to about 28 percent bound styrene or, for some applications, an E-SBR having a medium to relatively high bound styrene content of about 30 to about 45 percent. By emulsion polymerization prepared E-SBR, it is meant that styrene and 1,3-butadiene are copolymerized as an aqueous emulsion. Such rubbers are well known to those skilled in such art. The bound styrene content can vary, for example, from about 5 to about 50 percent.

Other rubbers specifically included within that term as used herein are: 1) solution polymerization prepared SBR (S-SBR) typically having a bound styrene content of about 5-50 percent. This S-SBR is typically prepared by organo lithium catalyzation in the presence of an organic hydrocarbon solvent; 2) 3,4-polyisoprene rubber (3,4-PI), see U.S. Pat. No. 5,087,668; and 3) cis-1,4-polybutadiene rubber (BR), which is typically prepared by organic solution polymerization of 1,3-butadiene, and often has at least a 90 percent cis 1,4-content.

The method of the present invention may be used with varying amounts of rubber and TOH. Generally, the amount of TOH that may be added to the vulcanizable material is from about 0.1 to about 6.0 phr. Preferably, the amount of TOH that is added ranges from about 0.5 to about 5.0 phr. The term "phr" or "PHR" as used herein, and according to conventional practice, refers to "parts by weight of a respective material per 100 parts by weight of rubber, or elastomer".

Rubber compounders use various materials in rubber to obtain the desired processing characteristics, ultimate properties of the finished product or cost control. Such materials may be classified as vulcanizing agents, accelerators, accelerator activators and retarders, age resistors, processing aids, reinforcing pigments and resins, inert fillers and special purpose materials. The present invention provides for the use of TOH in rubber compounds, optionally with any of the foregoing listed functional ingredients.

Thus, the TOH may be used in conjunction with conventional compounding additives such as accelerators, activators, antidegradants, antioxidants, antiozonants, carbon black, curing aids, fillers, oils, peptizing agents, pigments, plasticizers, processing additives, resins, retarders, sulfur donors, synthetic silica, tackifier resins, waxes, and zinc oxide.

For the purposes of this invention, "sulfur vulcanizing agent" means an elemental sulfur or sulfur donating vulcanizing agent, for example, elemental sulfur (free sulfur), an amine disulfide, polymeric polysulfide and sulfur olefin adducts. Preferably, the sulfur vulcanizing agent is elemental sulfur. The sulfur vulcanizing agent may be used in an amount ranging from 0.5 to 8.0 phr, with a range of from 1.5 to 6.0 phr being preferred.

The TOH of the present invention typically have some sulfur-containing materials, and in a preferred embodiment of the invention, the TOH does have some sulfur-containing components.

The vulcanizable composition of the present invention may be used with conventional accelerators. In general, accelerators are used to control the time and/or temperature required for vulcanization and to improve the properties of the vulcanizate. Suitable types of accelerators that may be used in the present invention are amines, disulfides, guanidines, thioureas, thiazoles, thiurams, sulfenamides, dithiocarbamates and xanthates. Thus, in one aspect of the present invention, a single accelerator system is used, where this single accelerator may also be referred to as the primary accelerator. The primary accelerator(s) is typically used in a total amount ranging from about 0.5 to about 4.0 phr. However, in another aspect, combinations of a primary and a secondary accelerator might be used with the secondary accelerator being used in smaller amounts, such as from about 0.05-3.00 phr, in order to activate and to improve the properties of the vulcanizate. Combinations of these accelerators may produce a synergistic effect on the final properties. In addition, delayed action accelerators may be used which are not affected by normal processing temperatures but produce a satisfactory cure at ordinary vulcanization temperatures. Vulcanization retarders might also be used. Preferably, the primary accelerator is a sulfenamide. If a second accelerator is used, the secondary accelerator is preferably a guanidine, dithiocarbamate or thiuram compound.

Typical amounts of antioxidants are in the range of about 1 to about 5 phr. Representative antioxidants may be, for example, diphenyl-p-phenylenediamine and others, such as, for example, those disclosed in the Vanderbilt Rubber Handbook (1978), pages 344-346. The antiozonant, if present, in typically used in an amount range from about 1 to 5 phr. The processing aids typically comprise about 1 to about 50 phr of the compounded composition. Such processing aids can include, for example, aromatic, naphthenic and/or paraffinic processing oils (e.g., FLEXON™ 111 from Exxon Chemical). When present, the tackifier resin is typically used in an amount of about 0.5 to about 10.0 phr, usually about 1 to about 5 phr. Typical amounts of waxes comprise about 1 to about 5 phr, with microcrystalline waxes being a very commonly used type of wax. Typical amounts of peptizers comprise about 0.1 to about 1.0 phr. Typical peptizers may be, for example, pentachlorothiophenol and dibenzamidodiphenyl disulfide. Suitable amounts of zinc oxide comprise about 2 to about 5 phr.

The formulation of fatty acids into elastomeric mixtures is well known and the same methods and formulations that are commonly employed in the art may be used with the present invention, with an important exception. As stated above, TOH contains a relatively large amount of neutrals, and this difference in composition between TOH and other fatty-acid materials and mixtures leads, in one aspect of the present invention, to the following modification of "standard" formulations and methods.

TOH has a lower acid number than stearic acid, oleic acid, or TOFA. This means that equal weights of TOH and any of stearic acid, oleic acid or TOFA will find the TOH with a significantly fewer number of carboxylic acid groups. To address this distinction, according to the present invention, TOH is preferably incorporated into an elastomeric mixture at such a concentration that they contribute the same number of carboxylic acid groups as would be provided if stearic acid, oleic acid or TOFA were used in the formulation. For reference, the acid number of stearic acid is about 205, while the acid number of TOH is about 135. Therefore, due to the lower acid number of TOH, more TOH on a weight basis will preferably be incorporated into an elastomer formulation than would stearic acid, oleic acid or TOFA. In this way, the formulation retains the number of carboxylic acid groups that are commonly employed in formulations of this type.

However, the use of relatively more TOH (than, e.g., stearic acid) in a standard formulation means that the elastomeric composition has relatively more neutral materials. Accordingly, the present invention further provides that a standard formulation be adjusted, when it incorporates, TOH, such that the amount of processing oil in the formulation is reduced by an amount, on a weight basis, approximately equal to the amount of neutrals (or unsaponifiables) that are being contributed by the TOH.

As an example, in a "standard" formulation having 70.0 phr natural rubber, 2.0 phr stearic acid (having an acid number of about 205) and 7 phr of a hydrocarbon oil (e.g., FLEXON™ 111, an aromatic oil from Exxon Chemical), when the stearic acid is replaced with TOH (having an acid number of about 135), then 3.1 phr of TOH is used in the formulation, and the amount of hydrocarbon oil is reduced to 5.9 phr.

According to the present invention, it is possible to replace, on an equal weight basis, stearic acid for TOH in a standard formulation, and make no other adjustments to the formulation. However, making the adjustments as set forth above typically provides relative improvements in the vulcanization process and/or the resulting vulcanized rubber.

The rubber, TOH, and other components of the compounded formulation may be mixed together by conventional means known to those having skill in the rubber mixing art. For example, weighing and mixing of components may be done according to ASTM D-3182. Suitable equipment, e.g., mills, are available from Farrel Corporation (Ansonia, Conn., www.farrel.com). More specifically, the ingredients may be mixed together in at least two stages, namely at least one non-productive stage followed by a productive mix stage. The final curatives, including sulfur vulcanizing agents, are typically mixed in the final stage which is conventionally called the "productive" mix stage in which the mixing typically occurs at a temperature, or ultimate temperature, lower than the mix temperature(s) in the preceding non-productive mix stage(s). The rubber and TOH are typically mixed in a productive mix stages. The terms "non-productive" and "productive" mix stages are well known to those having skill in the rubber mixing art.

Cure properties of the compositions of the present invention may be determined using a Monsanto oscillating disc rheometer operated at a temperature of about 150° C., and at a frequency of about 10 hertz. A description of oscillating disc rheometers can be found in the Vanderbilt Rubber Handbook edited by Robert O. Ohm (Norwalk, Conn., R. T. Vanderbilt Company, Inc., 1990), pages 554-557. The use of this cure meter and standardized values read from the curve are specified in ASTM D-2084. A typical cure curve obtained on an oscillating disc rheometer is shown on page 555 of the 1990 edition of the Vanderbilt Rubber Handbook.

In such an oscillating disc rheometer, compounded rubber samples may be subjected to an oscillating shearing action of constant amplitude. The torque of the oscillating disc embedded in the stock that is being tested that is required to oscillate the rotor at the vulcanization temperature is measured. The values obtained using this cure test are very significant since changes in the rubber or the compounding recipe are very readily detected.

Upon vulcanization, the sulfur vulcanized composition of this invention can be used for various purposes. For example, the sulfur vulcanized rubber composition may be in the form of a tire, belt or hose. In case of a tire, it can be used for various tire components. Such tires can be built, shaped, molded and cured by various methods which are known and will be readily apparent to those having skill in such art. Preferably, the rubber composition is used in the tread of a tire. As can be appreciated, the tire may be a passenger tire, aircraft tire, truck tire and the like. Preferably, the tire is a passenger tire. The tire may also be a radial or bias, with a radial tire being preferred.

A significant advantage of the present invention is that it reduces the cost of production of rubber compounds by substituting lower cost fatty acids for more refined oleic or stearic acid as vulcanization activators with concomitant improvement in the adhesion, physical and dynamic properties of the vulcanizate. These properties include torque, minimum torque and modulus. This cost benefit is achieved while avoiding a very big concern of rubber compounders, namely, blooming of fatty acid to the surface of the rubber, where such blooming negatively impacts the strength of the rubber. Typically, highly fatty materials will tend to stay within the compounded mixture, rather than bloom out. However, since TOH has a significant amount of palmitic acid, which is a C16 saturated fatty acid, the likelihood of blooming being observed using TOH was thought to be significantly greater than when a C18 fatty acid was used in the composition. However, surprisingly, blooming was not a problem when TOH was compounded into a rubber formulation.

Another significant advantage recognizable to those skilled in rubber compounding is the described use of less process oil (such as the Flexon™ 111). Tall oil heads is derived from a renewable resource leading to advantages from an environmental standpoint in using less of the petroleum derived process oil.

The following examples are offered by way of illustration, and not by way of limitation.

EXAMPLES

In the following Examples, stearic acid (CAS # 57-11-4) was obtained from Harwick Chemical Manufacturing Corporation (Cuyahoga Falls, Ohio, www.harwickchemical.com, operating division of PolyOne Corporation, www.polyone.com) as their product HARWICK™ F-1500. The tall oil fatty acid (TOFA) used as a reference material was SYLFAT™ 95 TOFA from Arizona Chemical. BUDENE™ 1207 rubber is a high cis butyl polybutadiene rubber from Goodyear Chemical (Akron, Ohio, www.goodyear; division of Goodyear Company). N660 carbon black is a carbon black obtained from Cabot Corporation (Boston, Mass., www-.cabot-corp.com). Zinc Oxide was obtained from New Jersey Zinc (operating division of Zinc Corporation of America, Monaca, Pa.) as their product KADOX™ 911 zinc oxide. Agerite Superlite™ is an antioxidant from R.T. Vanderbilt Company, Inc. (Norwalk, Conn., www.rtvanderbilt.com). DUREZ™ 29095 is a phenolic resin obtained from Hooker, now owned by, OxyChem (Dallas, Tex., www.oxychem.com, subsidiary of Occidental Petroleum Corporation). FLEXON™ 111 is an oil with a high aromatic content, from Exxon Chemical Company (Houston, Tex.; www.exxon.com/exxonchemical).

Example 1

The performance properties of Tall Oil Heads (TOH), and two distillation fractions thereof, were compared to the performance properties of stearic acid and tall oil fatty acid (TOFA). Each of these test materials was characterized as set forth in Table 1.

Each of these test materials was compounded into a rubber formulation as set forth below, where PHR stands for per hundred parts (by weight) total rubber:

| | |
|---|---|
| SIR20 natural rubber | 70.0 PHR |
| BUDENE ™ 1207 high cis butyl rubber | 30.0 PHR |
| N660 carbon black | 50.0 PHR |
| KADOX ™ 911 zinc oxide | 2.2 PHR |
| AGERITE SUPERLITE ™ antioxidant | 1.0 PHR |
| Sulfur | 2.0 PHR |

-continued

| | |
|---|---|
| DUREZ ™ 29095 phenolic resin | 3.0 PHR |
| FLEXON ™ 111 oil | 7.0 PHR* |

*or a lesser quantity in proportion to the increase in quantity of test material.

The indicated components were weighed and mixed per ASTM D-3182, using a Farrel BR Banbury and Farrel. In these mixtures, TOH was tested at 2.0 PHR with 7.0 PHR FLEXON™ 111, and again at 3.08 PHR (in order to match the acid number of stearic acid, where this concentration was calculated by 205/133×2.00) with a reduction in FLEXON™ 111 to 5.92 PHR; Distillation Fraction No. 1 was tested at 2.0 PHR with 7.0 PHR FLEXON™ 111, and again at 2.17 PHR with a reduction in FLEXON™ 111 to 6.83 PHR; Distillation Fraction No. 2 was tested at 2.0 PHR with 7.0 PHR FLEXON™ 111, and again at 2.12 PHR with 6.88 PHR FLEXON™ 111; stearic acid was tested at 2.0 PHR with 7.0 PHR FLEXON™ 111; TOFA was tested at 2.0 PHR with 7.0 PHR FLEXON™ 111. Each of these eight formulations are summarized in TABLE 2.

The results from the testing are shown in Tables 3-6.

In Table 3, tensile properties were measured at STH per ASTM D-412 on Die C specimens, using a MTS 5/G series tester operating at 20 ipm crosshead speed. (Included M100 through M500). Tensile strength is measured in pounds/square inch (psi), where a variation of +/−70 is within experimental error, however a variation of at least +/−140 is showing a difference in properties. Modulus (M) was measured at 100%, 200%, 300%, 400% and 500% elongation (psi). Differences of greater than 200 psi are considered statistically significant. Percent UE is a measure of ultimate elongation, where no statistical difference is seen among the measured values. Shore A hardness (Shore A) was measured at STH per ASTM D-2240 using a Shore Instruments Model XA durometer. Shore A hardness values within +/−5 indicates insignificant difference. Tear strength was measured at STH per ASTM D-624 on Die C specimens using a MTS 5/G series tester operating at 20 ipm crosshead speed, and measured values are reported in terms of pounds per linear inch (pli).

Table 4 shows cure properties for the 8 mixtures of Tables 1 and 2, as determined using a Monsanto oscillating disc rheometer R100 operated at a temperature of about 300° F. and at a frequency of about 10 hertz. A description of oscillating disc rheometers can be found in the Vanderbilt Rubber Handbook edited by Robert O. Ohm (Norwalk, Conn., R.T. Vanderbilt Company, Inc., 1990), pages 554-557. The use of this cure meter and standardized values read from the curve are specified in ASTM D-2084-91 with oscillating disk rheometer #1). Minimum torque (ML) relates to processing viscosity. Maximum torque (MH) relates to cured modulus. The columns titled tc2, tc50 and tc95 refer to extent of total cure that was reached in 2 minutes, 50 minutes and 95 minutes, respectively, where 95 minutes is the optimal cure time. The specimens for tc95 were molded and cured at 300° F. per ASTM D-3182 using Mylar. In general, a shorter tc time is preferred. CRI refers to the cure rate index, which is a measure of the overall rate of cure.

Table 5 reports the tendency of the test formulations to bloom. This test was performed by milling 1"×1" swatches and observing them on a daily basis. Blooming is undesirable. None of the samples demonstrated blooming.

Table 6 reports the results of tack testing, where green tack was measured using a BFG Tel-Tak tester. Even with reduction of dwell time and load to very low values, each of the specimens demonstrated good tack in that cohesive rubber failure was observed before separation of the two surfaces, and essentially no difference was observed among the specimens.

In general the mixes containing the TOH and distillation fractions thereof performed very similarly to the stearic acid control. The differences are essentially within what would be considered batch to batch or lot to lot variation for stearic acid.

TABLE 1

CHARACTERIZATION OF TEST MATERIALS

| Description: | Tall Oil Heads | Distillation Fraction No. 1 from Tall Oil Heads | Distillation Fraction No. 2 from Tall Oil Heads | HARWICK F-1500 ™ Stearic Acid | Tall Oil Fatty Acid (TOFA) SYLFAT 95C ™ |
|---|---|---|---|---|---|
| Acid Number | 133 | 189 | 193 | 205 | 194 |
| Color, Gardner | 12 | 7 | 7 | | |
| Titer ° C. | | 59 | 55 | | Fatty, oily |
| Appearance | Semi-solid paste | Solid easily fusible | Solid easily fusible | White crystals | Liquid |
| Composition by Gas Chromatography | | | | | |
| Other light ends (less volatile than C16-0) | 12 | 6 | 7 | | |
| Myristic acid (C14-0) | 2 | | | 4 | |
| Palmitic acid (C16-0) | 45 | 82 | 68 | 27 | <1 |
| Heptadecanoic acid (C17-0) | 3 | 1 | 2 | 3 | |
| Stearic acid (C18-0) | <1 | <<1 | <1 | 62 | 2 |
| Oleic + Linoleic acids | 6 | <<1 | 6 | <<1 | 90 [Note 1] |
| Other components | 31 | 12 | 11 | 4 | 8 |
| Total Saturated Fatty Acids (myristic, palmitic, stearic) | 50 | 83 | 70 | 96 | 2 |

[Note 1]
In the case of TOFA, the oleic and linoleic value includes conjugated linoleic acids also.

TABLE 2

TEST FORMULATIONS

| | Batch ID No. | | | | | | | |
|---|---|---|---|---|---|---|---|---|
| | 1 | 2 | 3 | 4 | 5 | 6 | 7 | 8 |
| SIR20 natural rubber | 70.0 | 70.0 | 70.0 | 70.0 | 70.0 | 70.0 | 70.0 | 70.0 |
| BUDENE ™ 1207 high cis butyl rubber | 30.0 | 30.0 | 30.0 | 30.0 | 30.0 | 30.0 | 30.0 | 30.0 |
| N660 carbon black | 50.0 | 50.0 | 50.0 | 50.0 | 50.0 | 50.0 | 50.0 | 50.0 |
| KADOX ™ 911C zinc oxide | 2.4 | 2.4 | 2.4 | 2.4 | 2.4 | 2.4 | 2.4 | 2.4 |
| AGERITE SUPERLITE ™ antioxidant | 1.0 | 1.0 | 1.0 | 1.0 | 1.0 | 1.0 | 1.0 | 1.0 |
| Sulfur (RM) | 2.0 | 2.0 | 2.0 | 2.0 | 2.0 | 2.0 | 2.0 | 2.0 |
| DUREZ ™29095 phenolic resin | 3.0 | 3.0 | 3.0 | 3.0 | 3.0 | 3.0 | 3.0 | 3.0 |
| Subtotal | 158.4 | 158.4 | 158.4 | 158.4 | 158.4 | 158.4 | 158.4 | 158.4 |

| | Final #— | | | | | | | |
|---|---|---|---|---|---|---|---|---|
| Add on Mill: | 1 | 2 | 3 | 4 | 5 | 6 | 7 | 8 |
| FLEXON ™ ™111 oil | 7.00 | 7.00 | 7.00 | 7.00 | 7.00 | 6.83 | 6.88 | 5.92 |
| OBTS | 0.80 | 0.80 | 0.80 | 0.80 | 0.80 | 0.80 | 0.80 | 0.80 |
| HARWICK ™ F-1500 Stearic Acid | 2.00 | | | | | | | |
| Distillation Fraction No. 1 from TOH | | 2.00 | | | | 2.17 | | |
| Distillation Fraction No. 2 from TOH | | | 2.00 | | | | 2.12 | |
| Tall Oil Heads (TOH) | | | | 2.00 | | | | 3.08 |
| Tall Oil Fatty Acid SYLFAT ™ 95C | | | | | 2.00 | | | |

TABLE 3

SELECTED PERFORMANCE PROPERTIES OF TEST FORMULATIONS

| Batch ID No. | Tensile St (psi) | M100 (psi) | M200 (psi) | M300 (psi) | M400 (psi) | M500 (psi) | % UE | Shore A | Tear St (pli) |
|---|---|---|---|---|---|---|---|---|---|
| 1 | 3404 | 235 | 621 | 1205 | 1717 | 2349 | 660 | 55 | 238 |
| 2 | 3137 | 219 | 582 | 1124 | 1709 | 2343 | 640 | 54 | 273 |
| 3 | 3129 | 228 | 585 | 1141 | 1707 | 2351 | 630 | 55 | 266 |
| 4 | 3149 | 214 | 552 | 1033 | 1533 | 2113 | 670 | 53 | 353 |
| 5 | 3108 | 238 | 581 | 1095 | 1677 | 2303 | 630 | 54 | 241 |
| 6 | 3231 | 240 | 564 | 1112 | 1707 | 2382 | 610 | 55 | 258 |
| 7 | 3221 | 267 | 633 | 1179 | 1713 | 2371 | 620 | 55 | 336 |
| 8 | 3170 | 257 | 610 | 1153 | 1705 | 2291 | 630 | 55 | 272 |

TABLE 4

SUMMARY OF CURE RHEOMETER DATA AT 300° F.

| Compound ID | ML (in lbs.) | MH (in lbs.) | tc2 (min) | tc50 (min) | tc95 (min) | CRI |
|---|---|---|---|---|---|---|
| 1 | 5.4 | 29.1 | 7.49 | 11.11 | 20.03 | 9.04 |
| 2 | 5.9 | 29.0 | 8.03 | 11.37 | 19.62 | 9.72 |
| 3 | 5.9 | 28.7 | 8.13 | 11.73 | 20.34 | 9.29 |
| 4 | 6.2 | 27.5 | 8.24 | 11.11 | 18.69 | 10.93 |
| 5 | 6.6 | 29.9 | 8.03 | 11.16 | 18.97 | 10.26 |
| 6 | 6.2 | 29.1 | 7.98 | 11.53 | 20.20 | 9.17 |
| 7 | 6.3 | 29.6 | 8.01 | 11.40 | 19.77 | 9.51 |
| 8 | 6.5 | 29.4 | 7.77 | 10.66 | 18.71 | 10.76 |

TABLE 5

UNCURED BLOOM OBSERVATIONS

| Compound ID | Day 1 | Day 2 | Day 3 | Day 4 | Day 5 |
|---|---|---|---|---|---|
| 1 | None | None | None | None | None |
| 2 | None | None | None | None | None |
| 3 | None | None | None | None | None |
| 4 | None | None | None | None | None |
| 5 | None | None | None | None | None |
| 6 | None | None | None | None | None |

TABLE 5-continued

UNCURED BLOOM OBSERVATIONS

| Compound ID | Day 1 | Day 2 | Day 3 | Day 4 | Day 5 |
|---|---|---|---|---|---|
| 7 | None | None | None | None | None |
| 8 | None | None | None | None | None |

TABLE 6

TACK TESTING

| Compound ID | Tack at 0 days | Tack at 1 days |
|---|---|---|
| 1 | cohesive failure | cohesive failure |
| 2 | cohesive failure | cohesive failure |
| 3 | cohesive failure | cohesive failure |
| 4 | cohesive failure | cohesive failure |
| 5 | cohesive failure | cohesive failure |
| 6 | cohesive failure | cohesive failure |
| 7 | cohesive failure | cohesive failure |
| 8 | cohesive failure | cohesive failure |

Example 2

In analogy to the tests run in Example 1, an additional set of testing was performed to test the efficacy of TOH (see Table 1), and Distillation Fraction No. 2 from TOH (see Table 1) to the performance of stearic acid. The three formulations that were tested are summarized, in terms of their ingredients, in Table 7. The same ingredients used in Example 1 were also used in this Example. The acidity contributed by the curing agent was maintained at a constant value by varying the amount of curing agent used, in proportion to the acid number of the curing agent. The amount of aromatic oil, specifically FLEXON™ 111, was varied to compensate for the variation in curing agent amount. Three batches of each sample formulation was prepared (i.e., Samples 9A, 9B, 9C, 10A, 10B, 10C, 11A, 11B, and 11C were prepared and tested).

The formulations set forth in Table 7 were weighed and mixed per ASTM D-3182, using a Farrel BR Banbury and Farrel. Tables 8-10 set forth the test results that were obtained. In these Tables: ODR cure rheometric measurements were performed per ASTM D-2084-95 at 300° F. and 1° arc; uncured bloom rating was determined after the samples sat for 7 days at room temperature; standard test plaques were molded and cured per ASTM D-3182-89 per the following conditions:

| 9A) 24.3 minutes @ 300° C. | 9B) 22.8 minutes @ 300° C. | 9C) 23.2 minutes @ 300° C. |
|---|---|---|
| 10A) 22.8 minutes @ 300° C. | 10B) 24.1 minutes @ 300° C. | 10C) 23.2 minutes @ 300° C. |
| 11A) 22.8 minutes @ 300° C. | 11B) 22.7 minutes @ 300° C. | 11C) 23.0 minutes @ 300° C.; | tensile properties were measured per ASTM D-412 on Die C specimens, using a MTS 5/G Series operating at 20 ipm crosshead speed; shore "A" hardness measurements were obtained per ASTM D-2240 using a Shore Instruments Model XA durometer; tear strength measurements were made according to ASTM D-624 on Die C specimens using a MTS 5/G Series operating at 20 ipm crosshead speed; heat aging was performed for 70 hours at 70° C. per ASTM D-573-88 followed by tensile and hardness testing; % compression set was measured per ASTM D-395-97 Method B at 70° C. for 22 hours; DeMattia flex fatigue/cut growth tests were performed per ASTM D-813; H-Block adhesion testing was done according to an internal B.F. Goodrich procedure; Dynamic Mechanical Analysis was accomplished per ASTM D-5992-96; fabric adhesion testing was done per ASTM D-429 method B using a MTS 5/G series tester operating at 2 ipm crosshead speed. In Table 10, DMA analysis was performed at 60° C. for the static strain and 10% for the dynamic strain ±2%.

Analysis of the test results leads to the following conclusions. The mechanical properties and cure rates were found to be very similar upon comparing the two TOH materials to pure stearic acid. The moduli of the TOH materials were a little lower that the stearic acid materials. No difference in bloom was seen over the 7 day observation period, and all batches remained essentially bloom free and very tacky through the 7 days. Whether tested by H block method on cord or by peel adhesion to fabric, there was a very small reduction in adhesion for both TOH materials compared to the stearic acid-containing samples. Dynamic properties, cut growth, and tan δ were equal to or superior for the TOH-containing materials compared to the stearic acid-containing materials. Distilled Tall Oil Fraction No. 2 exhibited remarkably long life in the DeMattia test. While heat aging showed no difference in hardness or modulus, both TOH-containing materials suffered greater tensile and elongation loss than the stearic acid-based materials.

TABLE 7

PPHR RECIPE

| Item No. | Ingredients | Description | Sample ID No. 9 | 10 | 11 |
|---|---|---|---|---|---|
| 1 | SIR 20 | National Rubber | 70.0 | 70.0 | 70.0 |
| 2 | BUDENE ™ 1207 | PBd | 30.0 | 30.0 | 30.0 |
| 3 | N660 | Carbon Black | 50.0 | 50.0 | 50.0 |
| 4 | KADOX ™911C | ZnO | 2.4 | 2.4 | 2.4 |
| 5 | HARWICK ™ F1500 | Curing Agent | 2.0 | -0- | -0- |
| 6 | TOH Distillation Fraction No. 2 | Curing Agent | -0- | 2.3 | -0- |
| 7 | TOH | Curing Agent | -0- | -0- | 2.7 |
| 8 | FLEXON ™ 111 | Aromatic Oil | 7.0 | 6.7 | 6.3 |
| 9 | AGERITE STAYLITE ™ | Antioxidant | 1.0 | 1.0 | 1.0 |
| 10 | DUREZ ™ 29095 | Phenolic Resin | 3.0 | 3.0 | 3.0 |
| 11 | Sulfur | Cure | 2.0 | 2.0 | 2.0 |
| 12 | OBTS | Accelerator | 0.8 | 0.8 | 0.8 |

TABLE 8

SUMMARY OF TEST RESULTS: SCREENING TESTS

| Test | | Sample No. 9 | | | Sample No. 10 | | | Sample No. 11 | | |
|---|---|---|---|---|---|---|---|---|---|---|
| | | Batch A | Batch B | Batch C | Batch A | Batch B | Batch C | Batch A | Batch B | Batch C |
| ODR: | | | | | | | | | | |
| ML | (in · lbs) | 6.7 | 6.6 | 6.8 | 6.5 | 6.5 | 6.5 | 6.9 | 7.0 | 7.1 |
| MH | (in · lbs) | 27.5 | 29.1 | 28.8 | 27.6 | 26.6 | 27.7 | 27.3 | 27.4 | 27.4 |
| Ts2 | (min.) | 9.9 | 9.8 | 9.7 | 10.0 | 10.5 | 10.2 | 10.4 | 10.3 | 10.6 |
| TC95 | (min.) | 24.0 | 22.3 | 23.2 | 22.8 | 24.1 | 23.2 | 22.8 | 22.7 | 23.0 |
| CRI | | 7.4 | 8.6 | 8.0 | 8.3 | 8.1 | 8.4 | 9.0 | 8.9 | 8.9 |
| Tensile St. | (psi) | 3300 | 3230 | 3330 | 3100 | 3300 | 3460 | 3420 | 3360 | 3330 |
| M100 | | 263 | 272 | 249 | 258 | 233 | 254 | 243 | 246 | 241 |
| % UE | | 580 | 570 | 600 | 550 | 650 | 620 | 640 | 640 | 640 |
| Shore A | (pts) | 57 | 56 | 54 | 54 | 54 | 55 | 54 | 55 | 55 |
| Die C Tear | (pli) | 254 | 294 | 269 | 282 | 268 | 253 | 281 | 263 | 340 |
| Bloom rating (7 day) | | none | none | none | none | none | none | none | none | none |

TABLE 8-continued

SUMMARY OF TEST RESULTS: SCREENING TESTS

| Test | | Sample No. 9 | | | Sample No. 10 | | | Sample No. 11 | | |
|---|---|---|---|---|---|---|---|---|---|---|
| | | Batch A | Batch B | Batch C | Batch A | Batch B | Batch C | Batch A | Batch B | Batch C |
| Adhesion to Fabric | (pli) | 15.4 | 17.3 | 18.3 | 15.3 | 15.3 | 16.75 | 13.9 | 14.6 | 16.0 |
| H-Block Adhesion at 5 ipm | (lbs) | | 13.5 | | | 11.4 | | | 9.3 | |

TABLE 9

QUALIFICATION TESTING

| Test | | Sample 9 Batch C | Sample 10 Batch C | Sample 11 Batch C |
|---|---|---|---|---|
| % Compression Set B (22 h/70° C.) | (%) | 26.4 | 28.4 | 29.3 |
| DeMattia Flex (cycles to 500% cut) | (cycles) | 180K | 550K | 197K |
| Dynamic Mechanical Analysis | | | | |
| 60° C./Static Strain 10% | (E') | 8.32 | 7.82 | 7.83 |
| Dynamic Strain ±2% | (E") | 0.96 | 0.80 | 0.85 |
| 10 Hz | (E*) | 8.38 | 7.86 | 7.87 |
| | (tan delta) | 0.12 | 0.10 | 0.11 |
| Heat Aged 70 h/70° C. | | | | |
| Change in Tensile St | (%) | −12.8 | −21.3 | −16.1 |
| Change in M100 | (%) | 33.7 | 30.3 | 32.9 |
| Change in % UE | (%) | −16.7 | −24.2 | −20.3 |
| Change in Shore A | (pts) | 7 | 5 | 7 |

TABLE 10

DYNAMIC MECHANICAL ANALYSIS

| Frequency (Hz) | E' | E" | E* | tan delta |
|---|---|---|---|---|
| Sample 9C | | | | |
| 0.1 | 7.14 | 0.70 | 7.17 | 0.10 |
| 0.2 | 7.27 | 0.72 | 7.31 | 0.10 |
| 0.5 | 7.45 | 0.75 | 7.49 | 0.10 |
| 1.0 | 7.62 | 0.79 | 7.66 | 0.10 |
| 2.0 | 7.80 | 0.83 | 7.84 | 0.11 |
| 5.0 | 8.09 | 0.90 | 8.14 | 0.11 |
| 10.0 | 8.32 | 0.96 | 8.38 | 0.12 |
| 20.0 | 8.6 | 1.04 | 8.66 | 0.12 |
| 50.0 | 8.92 | 1.08 | 8.98 | 0.12 |
| Sample 10C | | | | |
| 0.1 | 6.72 | 0.56 | 6.74 | 0.08 |
| 0.2 | 6.84 | 0.58 | 6.86 | 0.08 |
| 0.5 | 7.01 | 0.62 | 7.04 | 0.09 |
| 1.0 | 7.17 | 0.65 | 7.20 | 0.09 |
| 2.0 | 7.34 | 0.69 | 7.37 | 0.09 |
| 5.0 | 7.60 | 0.75 | 7.63 | 0.10 |
| 10.0 | 7.82 | 0.80 | 7.86 | 0.10 |
| 20.0 | 8.06 | 0.87 | 8.11 | 0.11 |
| 50.0 | 8.35 | 0.89 | 8.40 | 0.11 |
| Sample 11C | | | | |
| 0.1 | 6.67 | 0.59 | 6.69 | 0.09 |
| 0.2 | 6.79 | 0.61 | 6.82 | 0.09 |
| 0.5 | 6.98 | 0.66 | 7.01 | 0.09 |
| 1.0 | 7.15 | 0.69 | 7.18 | 0.10 |
| 2.0 | 7.31 | 0.73 | 7.35 | 0.10 |
| 5.0 | 7.59 | 0.79 | 7.63 | 0.10 |
| 10.0 | 7.83 | 0.85 | 7.87 | 0.11 |
| 20.0 | 8.07 | 0.92 | 8.12 | 0.11 |
| 50.0 | 8.41 | 0.93 | 8.46 | 0.11 |

As to each publication or patent referenced herein, that publication or patent is incorporated herein by reference in its entirety for all purposes.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method for making a cross-linked elastomer which comprises compounding a mixture comprising a vulcanizable elastomer, a sulfur source, and Tall Oil Heads (TOH), the TOH comprising 40 to just under 90 wt % fatty acids and greater than 10 wt % unsaponifiable materials, wherein said TOH comprises palmitic acid as the predominant fatty acid and heating the compounded mixture to a temperature sufficient to cause substantial crosslinking of the elastomer.

2. A method for making a cross-linked elastomer which comprises compounding a mixture comprising a vulcanizable elastomer, a sulfur source, and from about 0.1 to about 6.0% by weight of Tall Oil Heads (TOH), and heating the compounded mixture to a temperature sufficient to cause substantial crosslinking of the elastomer wherein said TOH comprises palmitic acid as the predominant fatty acid.

3. A method of enhancing the cure of a sulfur vulcanizable elastomer selected from the group consisting of natural rubber, synthetic rubber or mixture thereof which comprises adding Tall Oil Heads (TOH) to a sulfur vulcanizable elastomer to provide an admixture, and heating the admixture to a temperature sufficient to achieve vulcanization, wherein said TOH comprises palmitic acid as the predominant fatty acid.

4. A method of enhancing the cure of a sulfur vulcanizable elastomer selected from the group consisting of natural rubber, synthetic rubber or mixture thereof which comprises adding a distillation fraction of Tall Oil Heads (TOH) to a sulfur vulcanizable elastomer to provide an admixture, and heating the admixture to a temperature sufficient to achieve vulcanization, wherein the distillation fraction comprises at least 50 wt % palmitic acid.

5. The method of any one of claims 1-4 wherein said elastomer is selected from the group consisting of natural rubber, neoprene, polyisoprene, butyl rubber, polybutadiene, styrene-butadiene copolymer, styrene/isoprene/butadiene rubber, methyl methacrylate-butadiene copolymer, isoprene-styrene copolymer, methyl methacrylate-isoprene copolymer, acrylonitrile-isoprene copolymer, acrylonitrile-butadiene copolymer, EPDM and mixtures thereof.

6. The method of any one of claims 1-4 wherein the TOH comprises at least one terpene selected from the group α-pinene, β-pinene, camphene, 3-carene, and 1-terpineol.

7. The method of any one of claims 1-4 wherein the TOH comprises at least one hydrocarbon selected from β-cadinene and retene.

8. The method of any one of claims 1-4 wherein the TOH contains at least 0.2 wt % 3,5-dimethoxystilbene (DMS).

9. The method of any one of claims 1-4 wherein the TOH contains a phenolic material selected from phenol, guaiacol, ethylguaiacol, hydroeugenol, eugenol, cis-isoeugenol, trans-isoeugenol and acetoguaiacol.

10. The method of any one of claims 1-4 wherein the TOH has an acid number in the range, of 100-175.

11. The method of any one of claims 1-4 wherein 95 wt % of the TOH has a boiling point of less than, about 223° C. at 8-12 mm Hg pressure.

12. The method of claim 4 wherein the distillation fraction from TOH has a palmitic acid content of at least 75 wt %.

13. The method of claim 4 wherein the distillation fraction from TOH has an acid number within the range of 150-220.

14. A compounded mixture for preparing a cross-linked elastomer, the mixture comprising a vulcanizable elastomer, a sulfur source, and Tall Oil Heads (TOH), the TOH comprising unsaponifiables and fatty acids where the weight of the unsaponifiable fraction exceeds 10% based on the total weight of the TOH, and wherein said TOH comprises palmitic acid as the predominant fatty acid.

15. A compounded mixture for preparing a cross-linked elastomer, the mixture comprising a vulcanizable elastomer, a sulfur source, and a distillation fraction from Tall Oil Heads (TOH), the TOH comprising unsaponifiables and fatty acids where the weight of the unsaponifiable fraction exceeds 10% based on the total weight of the TOH, and wherein said TOH comprises palmitic acid as the predominant fatty acid.

16. The mixture of claim 14 or 15 wherein said elastomer is selected from the group consisting of natural rubber, neoprene, polyisoprene, butyl rubber, polybutadiene, styrenebutadiene copolymer, styrene/isoprene/butadiene rubber, methyl methacrylate-butadiene copolymer, styrene-styrene copolymer, methyl methacrylate-isoprene copolymer, acrylonitrileisoprene copolymer, acrylonitrile-butadiene copolymer, EPDM and mixtures thereof.

17. The mixture of claim 14 or 15 wherein the TOH comprises at least one terpene selected from the group α-pinene, β-pinene, camphene, 3-carene, and 1-terpineol.

18. The mixture of claim 14 or 15 wherein the TOH contains at least 0.2 wt % 3,5-dimethoxystilbene (DMS).

19. The mixture of claim 15 wherein the distillation fraction from TOH contains at least 50% palmitic acid based on the total weight of the distillation fraction.

20. The mixture of claim 15 wherein the distillation fraction from TOH has a palmitic acid content of at least 75 wt %.

21. The mixture of claim 14 or 15 wherein the TOH has an acid number in the range of 100-175.

22. The mixture of claim 14 or 15 wherein the TOH has a boiling point of less than about 223° C. at 8-12 mm Hg pressure.

23. The mixture of claim 14 wherein the TOH has an acid number in the range of 150-220.

* * * * *